United States Patent [19]

Noguchi et al.

[11] Patent Number: 4,587,420

[45] Date of Patent: May 6, 1986

[54] LIGHT BEAM SCANNING DEVICE FOR CORRECTING SCANNING SPEED

[75] Inventors: Masaru Noguchi; Akihiro Ohga, both of Kanagawa, Japan

[73] Assignee: Fuji Photo Film Co., Ltd., Kanagawa, Japan

[21] Appl. No.: 529,777

[22] Filed: Sep. 6, 1983

[30] Foreign Application Priority Data

Sep. 3, 1982 [JP] Japan .................................. 57-153451

[51] Int. Cl.⁴ ............................................. H01J 5/16
[52] U.S. Cl. .............................. 250/235; 250/237 G; 358/293
[58] Field of Search ........................ 250/216, 234–236, 250/237 G, 237 R; 350/6.5–6.91; 358/293

[56] References Cited

U.S. PATENT DOCUMENTS 4,206,348 6/1980 Davy et al. ........................ 250/235
4,408,826 10/1983 Ike ........................................ 250/236
4,429,220 1/1984 Noguchi ................................ 350/6.9

Primary Examiner—David C. Nelms
Assistant Examiner—J. Jon Brophy
Attorney, Agent, or Firm—Sughrue, Mion, Zinn, Macpeak & Seas

[57] ABSTRACT

In a light beam scanning device, first and second light spots scan a scanning plane and a planar grating pattern, respectively. The grating pattern has alternating transparent and opaque parts extending parallel to one another and is rotated by a predetermined angle in its own plane. A speed of scanning the grating pattern by the second light spot is detected to correct irregularities in a speed of scanning the scanning plane with the first light spot. Further, the scanning length on the scanning plane can be finely adjusted by the rotation of the grating pattern.

7 Claims, 6 Drawing Figures

LIGHT BEAM SCANNING DEVICE FOR CORRECTING SCANNING SPEED

BACKGROUND OF THE INVENTION

1. Field of the Invention

The present invention relates to a light beam scanning device in which scanning speed irregularities of a light spot on a scanning plane are corrected, and an effective length of scanning line can be finely adjusted.

2. Description of the Prior Art

A variety of light beam scanning devices have been developed for recording data on a recording material which is placed on a plane (hereinafter referred to as the "scanning plane") which is scanned with a light spot. These devices also read data from an original which is placed on the scanning plane, and they generally employ vibrating mirrors, such as galvanometers or rotary multi-mirrors, as their light beam deflectors. In these devices, it is desirable that the light spot scan the scanning plane at a constant speed because, if the scanning speed is irregular and non-constant, the pattern which is recorded or reproduced is distorted. For instance, in the case where the galvanometer is used, the scanning speed is considerably irregular when the accuracy of forming a sawtooth drive signal and the response accuracy or repetition accuracy of the galvanometer are taken into consideration. The irregularity is, in general, increased as the speed is increased.

On the other hand, when a rotary multi-mirror is used as the light beam deflector instead of a galvanometer, it is considerably difficult to rotate the mirror at a constant speed. Therefore, the scanning speed is irregular.

Heretofore, scanning speed irregularities have been substantially corrected by a method in which a grating pattern, which has transparent and opaque parts arranged alternately with a certain period in the scanning direction, is placed in a plane which is substantially equivalent to the scanning plane at which data are recorded or read. A photoelectric signal which is obtained from the grating pattern is then utilized as the scanning reference signal.

FIGS. 1, 2 and 3 show examples of a light beam scanning device incorporating this method. In these figures, reference numeral 1 designates a light beam deflector; reference numeral 2 illustrates a scanning lens; reference numeral 3 shows a scanning plane on which a recording material or an original to be read is placed; reference numeral 5 designates a grating pattern which is located on a grating plate; reference numeral 6 illustrates a condenser lens; reference numeral 7 shows a photo-detector; reference numeral 8 designates a first laser beam (indicated by a solid line) for scanning a recording material or original; and reference numeral 9 illustrates a second laser beam (indicated by the broken line) for scanning the grating pattern.

In FIG. 1, both the first and second laser beams 8 and 9 are coaxially applied to the vibrating mirror 1. After the beams 8 and 9 have been deflected by the vibrating mirror 1, these beams are separated from each other by a beam separating mirror 4 so that the first laser beam scans the scanning plane 3 on which a recording material or an original is placed, while the second laser beam scans the grating pattern 5.

In FIG. 2, the first laser beam 8 and the second laser beam 9 are applied to the vibrating mirror 1 at different incident angles; more specifically, the beams 8 and 9 are applied to both surfaces of the vibrating mirror 1, respectively. The first laser beam 8 is deflected by the vibrating mirror 1 and passes through a first scanning lens 2 in order to scan the scanning plane 3 on which a recording material or an original is placed. The second laser beam 9 is deflected by the rear surface of the vibrating mirror 1 and passes through a second scanning lens 2' in order to scan the grating pattern 5.

The performance of the apparatus shown in FIG. 3 is excellent, and this apparatus is relatively inexpensive to manufacture. In this apparatus, the first laser beam 8 is deflected by the vibrating mirror 1, and it then passes through the scanning lens 2 to scan the scanning plane 3 on which a recording material or an original is placed. The second laser beam 9 passes through a focusing lens 10 and is deflected by the rear surface of the vibrating mirror 1. The deflected laser beam 9 then scans a grating pattern 5 which is arranged in a deflection plane along a circumference which has the beam deflecting point as its center. Thus, the focusing lens 10 acts to focus the laser beam 9 on the grating pattern 5.

In any one of the methods described with reference to FIGS. 1, 2 and 3, the laser beam which is modulated by the grating pattern 5 is collected at the photo-detector 7 by the condenser lens so that scanning time is obtained with the output photoelectric signal of the detector 7 as a reference. The scanning lens 2 and 2' are generally fθ lenses, and in this case, the grating pattern 5 has transparent and opaque parts which are arranged alternately at a predetermined period. With a provision of such a grating pattern, scanning irregularities of a light spot on a scanning plane are corrected, since a signal clock timing of the light spot is controlled in timed relation to positions of the light spot. In addition, the length of the scanning line (scanning length) on the scanning plane is determined by the length of the grating pattern in the scanning direction.

In each of the above-described, conventional light beam scanning devices, the period of the grating pattern 5 is fixed, and, therefore, only one kind of photoelectric signal is obtained as the scanning reference signal, and the scanning length on the scanning plane is solely determined. This is disadvantageous in the case where it is necessary to finely adjust the scanning length. A typical example of a case in which the scanning length must be finely adjusted is the case in which, like the present invention, the light beam scanning is applied to laser printers or laser COM's (Computer Output Microfilmer).

For instance, in the case of a laser printer, a scanning laser beam is used to print output data from an electronic computer on a sheet on which forms, such as tables and frames, have been printed. Alternatively, the laser beam is used to print the output data on a blank sheet, together with a form which is exposed through a separately provided optical system. In either case, the timing of the laser beam scanning should be determined so that the data size is in agreement with the required, predetermined form size. The accuracy required in the case of a laser printer is 1/3000 (∼0.03%) if the number of points to be resolved on a scanning line is 3000 points, and an allowable error is one point in the number of resolution points. Thus, extremely high accuracy is required.

In order for the conventional technique to achieve such a high accuracy, the focal length of the fθ lens, the period of the grating pattern and the adjustment of the entire optical system must all be extremely accurate.

Accordingly, the light beam scanning device is necessarily very expensive when such high accuracy is required.

SUMMARY OF THE INVENTION

Accordingly, an object of the present invention is to provide a light beam scanning device in which scanning irregularities are corrected.

Another object of the present invention is to provide a light beam scanning device in which the scanning length on the scanning plane can be finely adjusted, without increasing the manufacturing cost.

A further object of the present invention is to provide a light beam scanning device in which the scanning length can be finely adjusted, affording high flexibility in use.

According to the present invention, irregularities in the scanning speed of the light spot which scans a scanning plane are corrected, and the scanning length can be finely adjusted by the utilization of a photoelectric signal which is obtained from a planar grating pattern which has transparent and opaque parts arranged alternately in a light beam scanning direction, the grating pattern being rotatable in its own plane.

DESCRIPTION OF THE PREFERRED EMBODIMENTS

Figure 1:
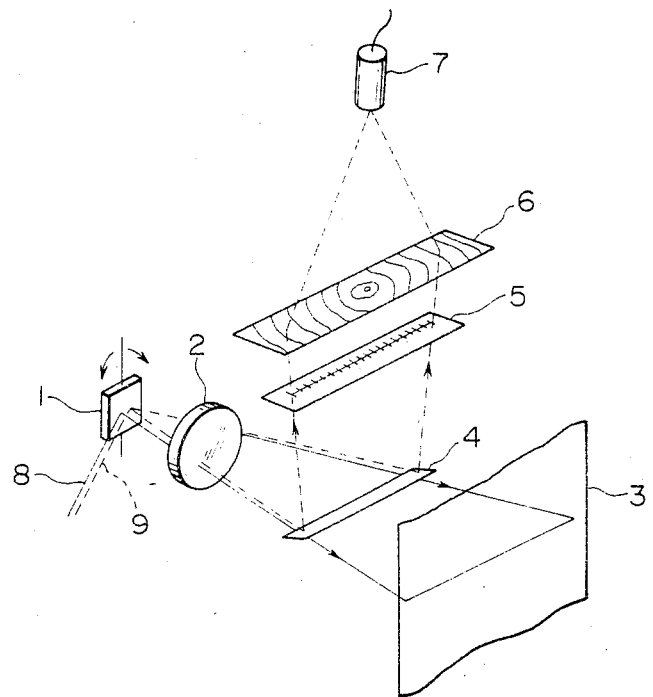
FIGS. 1, 2 and 3 are explanatory diagrams showing typical examples of conventional light beam scanning devices.
Figure 2:
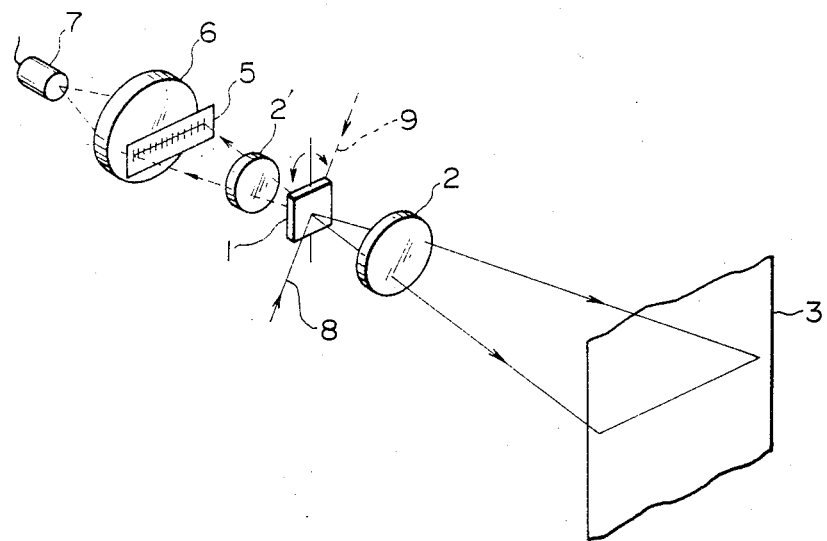
Figure 3:
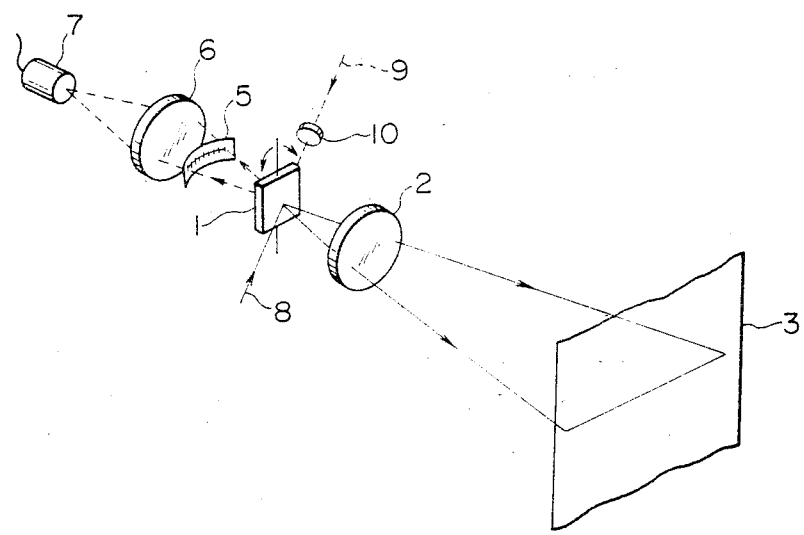
Figure 4A:
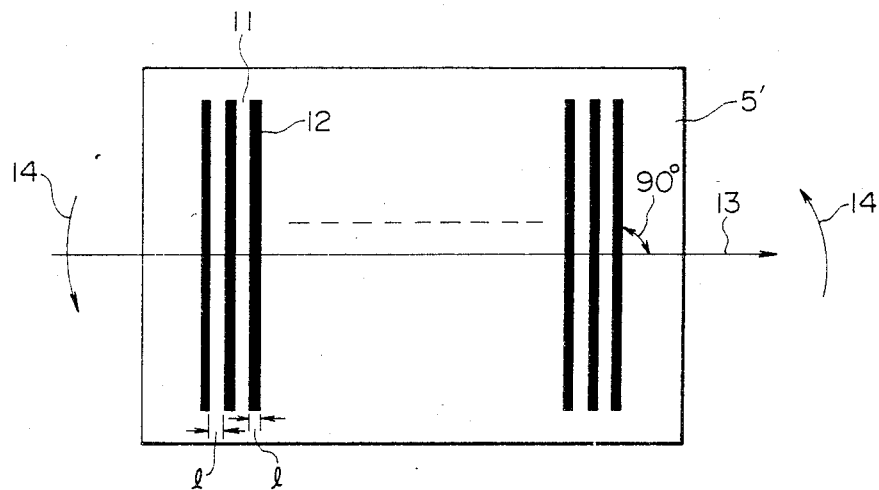
FIGS. 4A and 4B are an explanatory diagram outlining a grating pattern employed in a light beam scanning device according to the present invention.
Figure 4B:
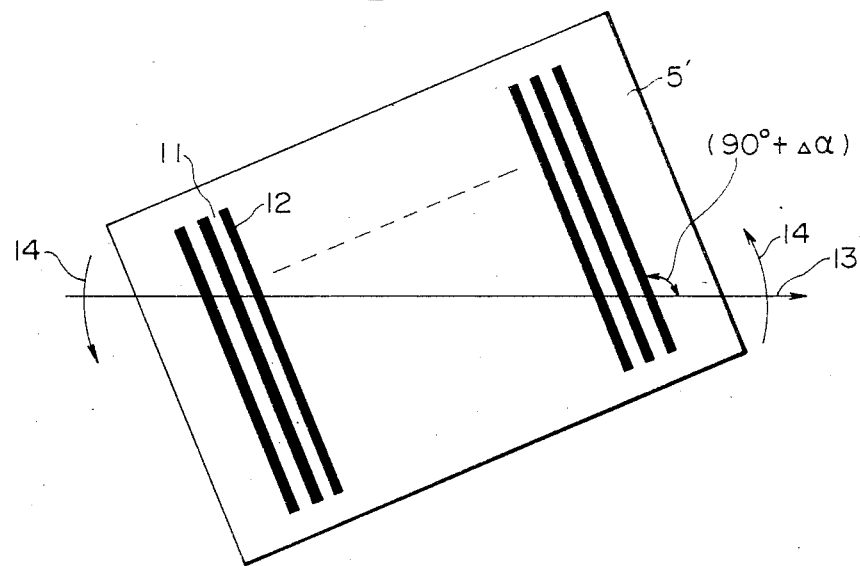

The present invention may be based on one of the conventional techniques described with reference to FIGS. 1 and 2. In any case, the grating pattern is a parallel pattern which has a constant period and which is mounted so that it is rotatable in its own plane as shown in FIGS. 4A and 4B. It is necessary to determine the size of the grating pattern, depending on which one of the conventional techniques described with reference to FIGS. 1 and 2 is utilized.

As shown in FIG. 4A, a grating pattern which consists of transparent parts 11 and opaque parts 12 which are arranged alternatively at equal intervals (1) is formed on a grating plate 5'. It should be noted that, although FIGS. 4A and 4B show only both end portions of the grating pattern, the pattern covers substantially the entire area of the grating plate. In FIG. 4A, reference numeral 13 designates a direction in which the light beam scans the grating pattern. FIG. 4A illustrates an embodiment in which the grating pattern and the light beam scanning direction 13 form a 90° angle, and FIG. 4B illustrates an embodiment in which the grating pattern and the light beam scanning direction 13 form an angle equal to (90° +$\Delta\alpha$). The grating plate 5' is arranged at the position of the grating plate 5 shown in FIGS. 1 or 2 in such a manner that it is rotatable along the direction indicated by the arrows 14. When the grating pattern and the light beam scanning direction form an angle (90° +$\Delta\alpha$), a distance l' through which the light beam passes through one transparent part is:

$$l' = l/\cos(\Delta\alpha).$$

Accordingly, in this case, the frequency of a photoelectric signal which is obtained by scanning the grating plate is lower by $(1/\cos \Delta\alpha - 1) \times 100\%$ than that which is provided when the grating forms a 90° angle with the light beam scanning direction, and the scanning length can be increased by an much as that rate. For instance, in the case in which the grating plate is rotatable by 30°, the frequency of a photoelectric signal which is obtained during scanning can be adjusted by about 15%, and the scanning length can also be adjusted by about 15%.

Figure 5:
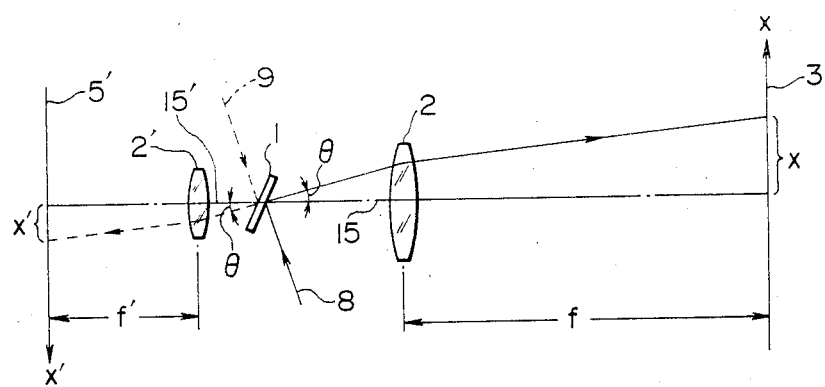
FIG. 5 is a plan view showing a part of one example of the device according to the present invention.

An example of the light beam scanning device of the present invention will now be described. FIG. 5 is a partial plan view showing a device which is formed on the basis of the conventional light beam scanning device shown in FIG. 2 but which has a rotatable grating plate. When the vibrating mirror is deflected by as much as an angle $\theta/2$ from its neutral position (or deflection center), both the first and second laser beams 8 and 9 are deflected as much as an angle $\theta$ from reference directions 15 and 15', respectively. The reference directions 15 and 15' are coincident with the optical axes of the first and second scanning lenses 2 and 2', respectively. When an f$\theta$ lens which has a focal length f is employed as the first scanning lens 2, and an f$\theta$ lens which has a focal length f' is employed as the second scanning lens 2', the spot position x of the deflected first laser beam on the scanning plane 3 is:

$$x = f\theta \qquad (1)$$

On the other hand, the spot position x' of the deflected second laser beam on the grating pattern 5' is:

$$x' = f'\theta \qquad (2)$$

From these two equations, $$x/x' = f/f' \qquad (3)$$

It is apparent from equation (3) that the spot position x of the first laser beam on the scanning plane 3 is proportional to the spot position x' of the second laser beam on the grating pattern 5', the coefficient of proportionality being (f/f') which is independent of the laser beam deflection angle $\theta$. Accordingly, if the period of the grating pattern is made constant, and the light spot which scans the scanning surface is timed with the photoelectric signal which is modulated by this grating pattern, then the scanning speed irregularity is corrected.

If, as described with reference to FIGS. 4A and 4B, the grating pattern 5 is rotatable through an angle $\Delta\alpha$ in its own plane, then x' in equation (3) can be adjusted by an amount equal to $$\left(\frac{1}{\cos \Delta\alpha} - 1\right) \times 100\%.$$

Accordingly, the spot position x on the scanning plane 3 is adjusted by this rate, and, as a result, the scanning length is also adjusted by this rate.

An application of the present invention will now be supplied in conjunction with a laser printer. When an effective scanning length Lx = 297 mm on the scanning plane which corresponds to the long side of size "A4" is covered with a deflection angle $2\theta = 30°$, the focal length of the first fθ lens 2 is f=Lx/2θ=567 mm. It is assumed that the number of picture elements to be resolved in the range of the effective scanning length is N=3,000 points. In general, clock pulses which correspond to picture elements are formed by multiplying the photoelectric signal which is obtained from the grating pattern 5'. If the factor of multiplication is ten (10), then, in this example, it is necessary to use a grating pattern of 300 line pairs in correspondence with the effective scanning length. When the focal length f' of the second fθ lens 2'is 100 mm, then the ideal value of the grating pattern width is L'x=f'·1 2θ=52.4 mm. If the grating pattern of 300 line pairs is formed to have this width, then its period is 174.7 μm/l.p. (line pair). If the allowable error in the effective scanning length is as much as one picture element, as described above, the accuracy must be extremely high (1/3000=0.03%) in the combination of the focal lengths of the fθ lenses, the width of the grating pattern and the arrangement of the entire optical system. However, it is practically impossible to achieve such a high accuracy because the focal length of an fθ lens, as manufactured, is only approximately 0.1% accurate, at best. In order to overcome this difficulty, in the present invention, the grating pattern is made rotatable in its own plane, as described above with reference to FIGS. 4A and 4B. The grating pattern is designed so that the angle which is formed between the grating pattern and the light beam scanning direction can be changed from 90° to 120°.

It is preferable that the period of 21 of the grating pattern be determined so that the middle value in the variable range of the grating period in the light beam scanning direction is substantially close to the ideal value of 174.7 μm/l.p. of the grating period. If, in this example, the grating pattern period is made to be 162.0 μm/l.p., and the grating period in the light beam scanning direction is variable, ranging between 162.0 μm/l.p. and 187.1 μm/l.p. The maximum grating period of 187.1 μm/l.p. is equal to 162.0 μm/l.p.×(1/cos 30°). Accordingly, the grating period in the light beam scanning direction can be adjusted within the range between −7.3% and +7.1%, with respect to its ideal value of 174.7 μm/l.p. Also, the grating pattern width can be adjusted within the range between 48.6 mm and 56.1 mm with respect to its ideal value, and the effective scanning length on the scanning plane 3, i.e., the size of data which are printed by the laser beam, can be adjusted within the range between 276 mm and 318 mm. Thus, within this range, the size of data to be printed by the laser beam can be matched with the size of the form.

While the present invention which is practiced on the basis of the conventional light beam scanning device shown in FIG. 2 has been described, it goes without saying that the present invention can be practiced on the basis of the conventional light beam scanning device shown in FIG. 1 as well. In addition, the present invention can be practiced on the basis of other light beam scanning devices. For example, the present invention can be practiced on the basis of a light beam scanning device which employs a rotary multimirror or an acoustic-optical light deflector, or it can be practiced on the basis of a light beam scanning device which employs a hologram light deflector as disclosed in a co-pending U.S. application Ser. No. 453,865 filed Dec. 28, 1982. The light beam scanning device of the present invention is not only applicable to a laser printer; it may also be utilized in a picture processing device such as a laser COM, a laser facsimile or a laser type plate processing device in which pictures are recorded or originals are read by scanning the light beam.

As is clear from the above description, the present invention provides a means of finely adjusting the scanning length of a light beam scanning device so that the scanning device can be produced at a relatively low cost and yet be high in accuracy.

We claim:

1. A light beam scanning device comprising:
    means for deflecting first and second light spots across a scanning plane and a planar grating pattern, respectively;
    means for detecting a scanning speed of said second light spot scanning on said grating pattern; and
    means for rotating said planar grating pattern in a first plane to vary a scanning length of said first light spot.

2. The device as claimed in claim 1, wherein said grating pattern comprises a series of alternating longitudinally extending parallel transparent and opaque parts, said first plane being a plane of said planar grating pattern.

3. The device as claimed in claim 1, wherein said deflecting means comprises a focusing lens for focusing said second light spot on said planar grating pattern, said first plane being perpendicular to an axis of said lens.

4. The device as claimed in claim 1, wherein said planar grating pattern is rotatable by an angle between −30° and +30° so that said second light spot scans said transparent and opaque parts so as to intersect said transparent and opaque parts at an angle anywhere between 60° and 120°.

5. The device as claimed in claim 1, wherein said detecting means comprises a photo-detector which detects a frequency said second light spot scans said transparent and opaque parts.

6. A method of finely adjusting and correcting a scanning length of a light spot on a scanning plane with a light spot, comprising the step of:
    directing a light spot across a grating pattern along a scanning direction, said grating pattern having alternating transparent and opaque parts extending parallel to one another;
    rotating said grating pattern by a predetermined angle to vary a scanning length of said light spot scanning said scanning plane.

7. The method as claimed in claim 6, wherein said predetermined angle is any angle between −30° and +30°.

* * * * *